United States Patent
Nakayama

(10) Patent No.: US 7,362,358 B2
(45) Date of Patent: Apr. 22, 2008

(54) CORRECTION OF LEVEL DIFFERENCE BETWEEN SIGNALS OUTPUT FROM SPLIT READ-OUT TYPE IMAGE SENSING APPARATUS

(75) Inventor: Satoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 734 days.

(21) Appl. No.: 10/913,852

(22) Filed: Aug. 6, 2004

(65) Prior Publication Data

US 2005/0030397 A1    Feb. 10, 2005

(30) Foreign Application Priority Data

Aug. 7, 2003   (JP)   ............... 2003-288865

(51) Int. Cl.
*H04N 5/225* (2006.01)
*H04N 5/235* (2006.01)
*H04N 5/217* (2006.01)

(52) U.S. Cl. ............... 348/229.1; 348/218.1; 348/241

(58) Field of Classification Search ............ 348/218.1, 348/222.1, 229.1, 230.1, 241–3, 362–4
See application file for complete search history.

(56) References Cited

U.S. PATENT DOCUMENTS 6,072,603 A * 6/2000 Parks ............... 358/504
6,337,713 B1 * 1/2002 Sato ............... 348/311
7,218,351 B2 * 5/2007 Miyahara et al. ........ 348/313
7,236,199 B2 * 6/2007 Hori et al. ............ 348/321
2002/0044779 A1 * 4/2002 Shiomi et al. .......... 396/429
2003/0071906 A1 * 4/2003 Matsumoto .............. 348/241

FOREIGN PATENT DOCUMENTS

| JP | 5-022667 | 1/1993 |
|----|----------|--------|
| JP | 11-308532 A | 11/1999 |
| JP | 2002-125149 | 4/2002 |
| JP | 2002-142158 | 5/2002 |
| JP | 2002-320142 A | 10/2002 |

* cited by examiner

*Primary Examiner*—John M. Villecco
*Assistant Examiner*—Dan Pasiewicz
(74) *Attorney, Agent, or Firm*—Morgan & Finnegan, L.L.P.

(57) ABSTRACT

Disclosed is an sensing apparatus using an image sensing device having at least first and second output terminals, comprising first and second amplifiers that independently amplify signals output from the first and second output terminals, respectively; a first gain controller that controls gain applied to the first amplifier; memory that stores data, which relates to gain to be applied to the second amplifier, that corresponds to respective ones of a plurality of different gains to be applied to the first amplifier; and a second gain controller that controls gain applied to the second amplifier in accordance with the data relating to gain to be applied to the second amplifier, obtained from the memory, corresponding to the gain applied to the first amplifier.

9 Claims, 9 Drawing Sheets

F I G. 4

| Anleft(dB) | Anright(linear) |
|---|---|
| 0 | 1024 |
| 0.264 | 1056 |
| 0.528 | 1088 |
| 0.792 | 1122 |
| 1.056 | 1156 |
| 1.320 | 1192 |
| ... | ... |

FIG. 7

| Anleft(dB) | Anright(cold) | Anright(hot) |
|---|---|---|
| 0 | 1024 | 1034 |
| 0.264 | 1056 | 1066 |
| 0.528 | 1088 | 1098 |
| 0.792 | 1122 | 1132 |
| 1.056 | 1156 | 1166 |
| 1.320 | 1192 | 1202 |
| ... | ... | ... |

CORRECTION OF LEVEL DIFFERENCE BETWEEN SIGNALS OUTPUT FROM SPLIT READ-OUT TYPE IMAGE SENSING APPARATUS

FIELD OF THE INVENTION

This invention relates to an image sensing apparatus that uses an image sensing device having a plurality of output terminals. More particularly, the invention relates to a technique for correcting the level differences between signals that are output from a plurality of output terminals.

BACKGROUND OF THE INVENTION

With the progress that has been made in recent digital signal processing techniques and semiconductor technology, consumer digital video standards have been proposed for digitally recording moving picture signals according to a standard television scheme such as NTSC or PAL, and digital video cameras obtained by integrating a digital video recording/playback apparatus and an image sensing apparatus have become available commercially as an application of these standards. Such a digital video camera exploits the digital recording capability and sometimes is equipped with a still-picture recording function. Further, there are digital video cameras equipped with a digital interface for connection to a computer or the like and having a function for loading a captured image into the computer. Furthermore, there are digital video cameras equipped with a plurality of writing/reading units conforming to plural kinds of recording media that can be selected among in accordance with the purpose for which an image is used.

In a case where an image that has been recorded by such a digital video camera is reproduced in a television by connecting the digital video camera to the television, there may be no problem whatsoever with regard to an image composed of 720×480 pixels, for example, which is defined by digital video standards. However, if the image is transferred to another medium via a digital interface, there are instances where a larger number of pixels is required for better image quality.

Further, an increase in the number of pixels possessed by image sensing devices has been accompanied by the need to drive such image sensing devices at higher frequencies in order to read out the information represented by all pixels of the device. This invites a decline in S/N ratio and an increase in power consumption.

One example of a method of raising the data rate of sensed-image information while suppressing the driving frequency of an image sensing device is a method of splitting the sensed-image screen into a plurality of areas, providing an independent charge transfer section, amplifier and output terminal for each area and reading sensed-image signals output of these areas in parallel. An example of a prior-art image sensing apparatus using such an image sensing device is illustrated in FIG. 8. As shown in FIG. 8, the screen of an image sensing device 800 is split into two, namely left and right, areas 801, 802 each having a photoelectric converter and vertical transfer section. The apparatus has horizontal transfer sections 803, 804, amplifiers 805 and 806 and output terminals 807, 808. Using an image sensing device having such a structure is advantageous in that sensed-image information is obtained at a data rate that is twice the driving frequency of the image sensing device.

The image of a subject that has been formed on the image sensing device 800 by an image forming optical system (not shown) is converted to an electric signal by the image sensing device 800, and electric signals are output from the output terminals 807, 808 in accordance with driving pulses supplied from a drive timing generating circuit, not shown.

The two image signals obtained from the image sensing device 800 are subjected to analog signal processing and then to an analog-to-digital conversion by analog front ends 809, 810, the digital signals are amplified to a prescribed level by amplifiers 813, 814, and then the left and right images are combined as a single image by a screen combining circuit 817. The output signal of the screen combining circuit 817 is subjected to gamma correction processing, contour correction processing and color correction processing, etc., by a camera signal processing circuit 818, and the result of processing is output from an output terminal 819 as a luminance signal and color difference signals (for example, see the specification of Japanese Patent Application Laid-Open No. 05-022667). The image sensing apparatus further includes a dB/linear conversion circuit 812 for converting a logarithmic value to a linear signal and a gain control circuit 815 for controlling the gain value during gain adjustment.

In this example of the prior art, however, the characteristics of the amplifiers and peripheral circuits provided for the respective areas are not uniform. As a result, a problem which arises is that if an image is generated by combining two areas, a decline in image quality occurs such as the occurrence of a boundary line ascribable to a difference in levels between the areas.

In order to deal with this problem, a method of correcting the level difference between the areas has been proposed in the specifications of Japanese Patent Application Laid-Open Nos. 2002-125149 and 2002-142158, by way of example. In these examples of the prior art, it is described that the gains and offsets of the left and right channels are adjusted to correct the level difference. The gain and offset values used are found in accordance with the difference between the image signals on the two channels obtained by projecting a prescribed amount of light from an LED upon the image sensing apparatus when a calibration command is received. However, regardless of the fact that the gain balance of the left and right channels for which the level difference can be adjusted varies in accordance with the size of the gain applied to the image signal, in other words, in accordance with the brightness of the image, the gain is acquired based upon an image signal of an image of substantially constant brightness at all times obtained by the projection light from the LED. Consequently, depending upon the brightness of the subject, there are instances where the level difference between the left and right channels cannot be corrected fully even if the correction is applied using the acquired gain.

SUMMARY OF THE INVENTION

The present invention has been made in consideration of the above circumstances and its object is to eliminate, irrespective of the size of gain used, differences in level ascribable to differences among a plurality of output signals obtained from an image sensing device, thereby making a boundary line appear inconspicuous.

According to the present invention, the foregoing object is attained by providing an image sensing apparatus using an image sensing device having at least first and second output terminals, comprising: first and second amplifiers that independently amplify signals that are output from the first and second output terminals, respectively; a first gain controller that controls gain applied to the first amplifier; memory that stores data, which relates to gain to be applied to the second amplifier, that corresponds to respective ones of a plurality of different gains to be applied to the first amplifier; and a second gain controller that controls gain applied to the second amplifier in accordance with the data relating to gain to be applied to the second amplifier, obtained from the memory, corresponding to the gain applied to the first amplifier.

According to the present invention, the foregoing object is also attained by providing a gain control method in an image sensing apparatus that includes an image sensing device having at least first and second output terminals, and first and second amplifiers that independently amplify signals that are output from the first and second output terminals, respectively, the method comprising steps of: controlling gain applied to the first amplifier; reading data relating to gain to be applied to the second amplifier from memory in accordance with gain applied to the first amplifier, the data, which relates to gain to be applied to the second amplifier, that corresponds to respective ones of a plurality of different gains to be applied to the first amplifier; and controlling gain applied to the second amplifier based upon the data read from the memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates an example of a gain table according to the first embodiment of the present invention;

FIG. 7 illustrates an example of a gain table according to the second embodiment of the present invention;

DETAILED DESCRIPTION OF THE PREFERRED EMBODIMENTS

Preferred embodiments of the present invention will be described in detail in accordance with the accompanying drawings.

First Embodiment

Figure 1:
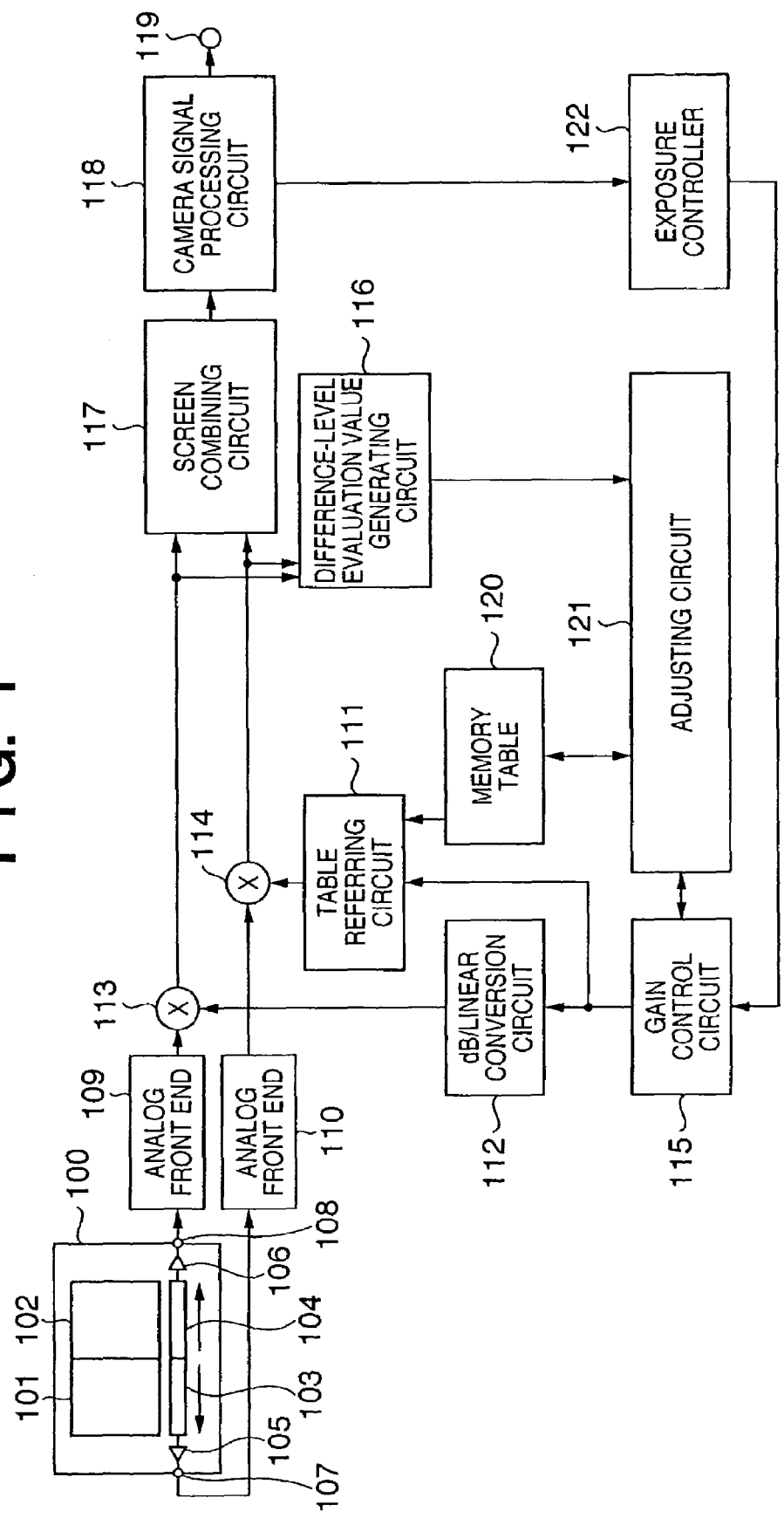
FIG. 1 is a block diagram illustrating the structure of a video camera according to a first embodiment of the present invention.

FIG. 1 is a diagram schematically illustrating the structure of a single area sensor type video camera according to a first embodiment of the present invention. As shown in FIG. 1, the video camera has a CCD- or MOS-type area sensor 100 split into two image sensing areas 101 and 102 each having an output terminal, a photoelectric conversion unit and a vertical transfer unit. Horizontal transfer sections 103, 104 are the result of dividing a horizontal transfer section into left and right portions about the center of the screen. The arrows underlying the horizontal transfer sections 103, 104 indicate the directions of charge transfer in the horizontal transfer sections 103, 104. More specifically, the image sensing areas 101 and 102 are not the result of physical splitting. Rather, since the horizontal transfer sections 103, 104 read out signals on left and right sides in split fashion, image signals are obtained in a form obtained by being split into two portions from the center. For the sake of convenience, however, the image sensing area of the area sensor 100 is expressed as being split.

The camera further includes output amplifiers 105, 106 for amplifying signal charge; output terminals 107, 108 for the sensed-image signals; analog front ends 109, 110 for performing correlated double sampling and AD conversion; gain adjusting circuits 113, 114 for adjusting gain; a gain control circuit 115 for providing gain used in gain adjustment; a dB/linear conversion circuit 112 for converting a logarithmic value to a linear signal; a difference-level evaluation value generating circuit 116 for detecting the non-uniformity (referred to as a "difference-level evaluation value" below) between two channels; a screen combining circuit 117 for generating a single image by combining the image signals of the two channels; a camera signal processing circuit 118; an output terminal 119; an adjusting circuit 121 for creating a gain table from the difference-level evaluation value; a memory table 120 constituted by a rewritable non-volatile memory; a table referring circuit 111 for acquiring gain data from the memory table 120 and supplying it to the gain adjusting circuit 114; and an exposure controller 122 (controlled by microcomputer) for controlling the exposure state of the area sensor 100 in accordance with the photometric value.

Described next will be operation at the time of ordinary photography by the single area sensor type video camera having the above-described structure of this embodiment.

The image of a subject that has been formed on the area sensor 100 is converted to signal charge by the photoelectric converters of the image sensing areas 101, 102, after which the signal charge is split into channels by the horizontal transfer sections 103, 104 and supplied to the output amplifiers 105, 106. The signal charge is amplified by the output amplifiers and output from the output terminals 107, 108.

The sensed-image signals on the left and right channels are subjected to correlated double sampling and AD conversion by the analog front ends 109, 110 and the digital signals are supplied to the gain adjusting circuits 113, 114.

The gain adjusting circuits 113, 114 apply a gain adjustment. Gain applied at the time of gain adjustment is supplied from the gain control circuit 115 in dependence upon the photometric value obtained from the exposure controller 122. Since the gain control circuit 115 outputs gain in the form of a logarithmic value for the sake of exposure control, the output signal is converted to a linear signal by the dB/linear conversion circuit 112, after which the linear signal is supplied to the gain adjusting circuit 113. In the image sensing apparatus that handles sensed-image signals on one channel according to the prior art, gain amplification of a signal quantity in a low-luminance environment is performed by analog circuitry. However, with an image sensing apparatus that handles sensed-image signals on two channels, as in this embodiment, gain adjustment by analog circuitry may possibly cause non-uniformity between the two channels. Accordingly, in this embodiment, gain adjustment is carried out by a digital operation using the gain adjusting circuits 113, 114, thereby eliminating the influence of circuit variance, fluctuation with the passage of time and fluctuation in temperature.

Figure 3:
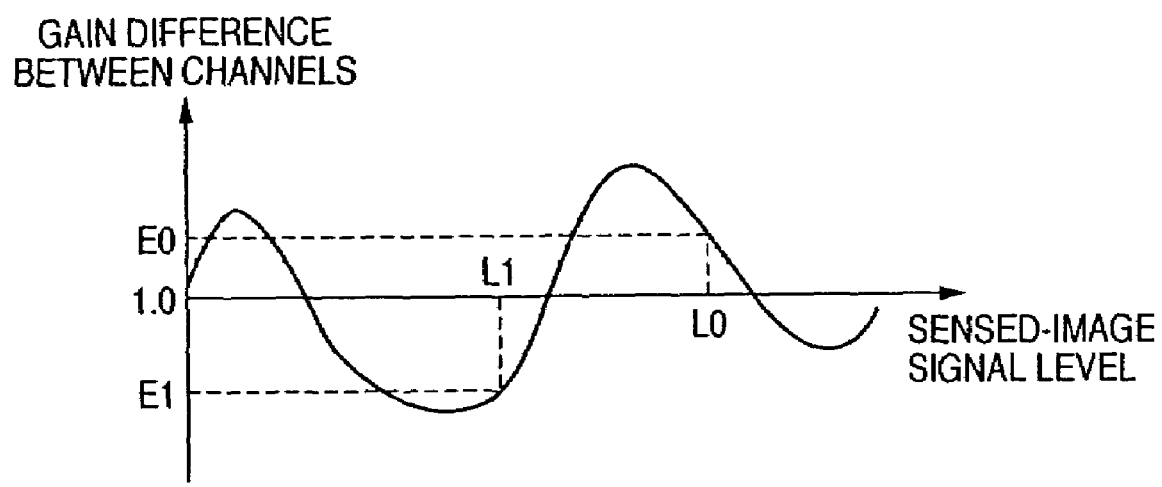
FIG. 3 is a diagram illustrating CCD output level and a gain difference between channels.

In the gain adjusting circuits 113 and 114, a correction for level difference between the two channels is performed in addition to gain adjustment for image brightness. The difference between the gains of the two channels generally is dependent upon the size of the output level of area sensor 100 (the brightness of the subject, in other words). FIG. 3 illustrates an example of the difference between the gains of two channels. Here the abscissa represents the output level of the left channel of area sensor 100, and the ordinate represents the ratio of the input signal (left channel) of gain adjusting circuit 113 to the input signal (right channel) of gain adjusting circuit 114, namely the gain difference between the signal levels of the two channels. For example, let L0left and L0right represent the left- and right-channel output levels, respectively, of area sensor 100 when a subject having a certain brightness has been sensed. The output levels L0left and L0right are measured by the difference-level evaluation value generating circuit 116, and gain difference E0 prevailing at this time is given by the following equation:

$$E0 = L0\text{right}/L0\text{left}$$

As illustrated in FIG. 3, the relationship between signal level and gain difference is not constant and therefore the amount of correction of gain difference should not be a constant value but is required to be changed in accordance with gain. In order to exercise gain control of the image sensing system, it is necessary to decide the gain with regard to one channel and provide the corresponding gain of the other channel. According to this embodiment, the arrangement is such that gain Anleft of the left channel is provided by the gain control circuit 115 and corresponding gain Anright of the right channel is provided by the table referring circuit 111.

If the gain of the left channel is A0left, then gain A0right of the right channel will be expressed by the following equation:

$$A0\text{right} = E0 \times A0\text{left}$$

Similarly, in case of the other gain Anleft, Anright is expressed by the following equation:

$$An\text{right} = En \times An\text{left}$$

Thus, by measuring En (=Lnright/Lnleft) while changing Anleft in steps, Anright corresponding to each gain can be obtained.

Next, measurement of the gain correction characteristic, namely a method of memory table, will be described.

Figure 2:
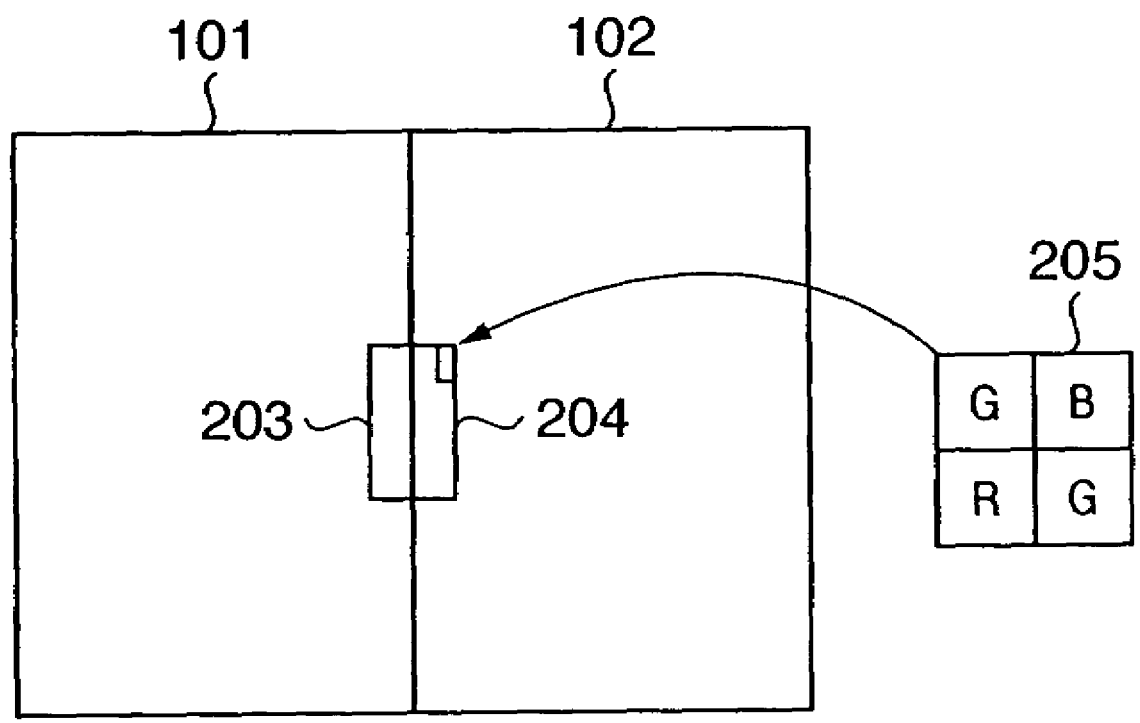
FIG. 2 is a diagram exemplifying rectangular areas at a split-screen boundary portion from which a signal value used for obtaining a gain correction characteristic is outputted.

The difference-level evaluation value generating circuit 116 calculates an evaluation value of the screen difference level based upon pixel values within rectangular areas specified in the vicinity of the boundary between the split areas and outputs this evaluation value to the adjusting circuit 121. An example of the rectangular areas within the screen is illustrated in FIG. 2. As shown in FIG. 2, rectangular areas 203, 204 are set in the proximity of the boundary line between the two image sensing areas 101, 102, and the pixel values within these areas 203, 204 are used to evaluate the screen difference level. In order for the area sensor 100 to sense a color image using a single chip, a on-chip color filter is affixed to the pixel portions. The on-chip color filter is an RGB array 205 of the kind shown in FIG. 2, by way of example. The difference-level evaluation value generating circuit 116 selects the pixel value of one color from among these colors, such as the color of the G signal, and calculates the average value in each of the rectangular areas 203, 204. This average value is the difference-level evaluation value between the screens.

When the gain correction characteristic is measured, a subject of uniform brightness is imaged and identical gain multipliers are set and applied to the gain adjusting circuits 113, 114 from the gain control circuit 115. The average level of the pixels in the rectangular area 203 and the average level of the pixels in the rectangular area 204 are output to the adjusting circuit 121 as the levels of the left and right channels, respectively.

Using the level of the left channel as a reference, the adjusting circuit 121 calculates the amount of gain correction of the right channel in the manner described above. The gain correction characteristic is generated by performing such measurement at prescribed intervals in the output level of the area sensor 100. Alternatively, the gain correction characteristic may be also generated by performing the same measurement by changing the luminance of the object. The adjusting circuit 121 stores the generated gain correction characteristic in the memory table 120, which is constituted by a rewritable non-volatile memory such as an EEPROM (Electrically Erasable Programmable Read-Only Memory). The gain correction characteristic is generated at the time of adjustment at the factory, by way of example.

When the amount of gain correction is calculated, the gain control circuit 115 obtains the gain based upon the photometric value from the exposure controller 122 and outputs the gain to the adjusting circuit 121.

FIG. 4 illustrates a table (gain table) of the gain correction characteristic thus measured. In FIG. 4, Anleft represents the gain for the left channel, which is expressed in logarithmic (dB) units, output from the gain control circuit 115, and Anright represents the gain for the right channel, which is expressed in linear terms, with respect to Anleft. The gain for the right channel Anright is expressed in linear terms because the gain table can be expressed in higher resolution in linear terms. 1024 of Anright represents gain of 1×, and 2048 represents gain of 2×. The interval of the numerical values of Anleft is 0.264 dB. The numerical values of Anright at this interval is stored as the gain table.

Gain control processing at the time of photography according to the first embodiment will be described next.

Figure 5A:
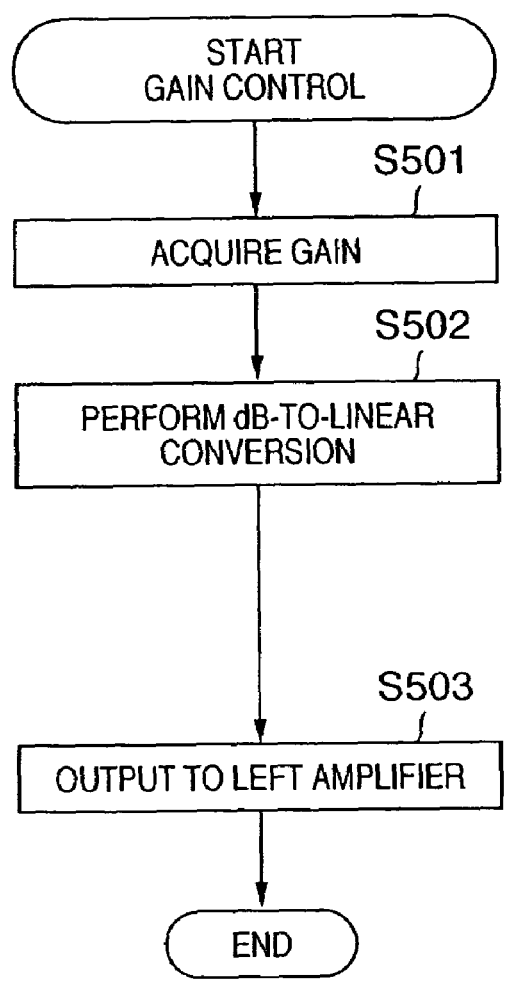
FIG. 5A is a flowchart illustrating gain control processing used in a gain adjusting circuit of a left channel according to the first embodiment of the present invention.
Figure 5B:
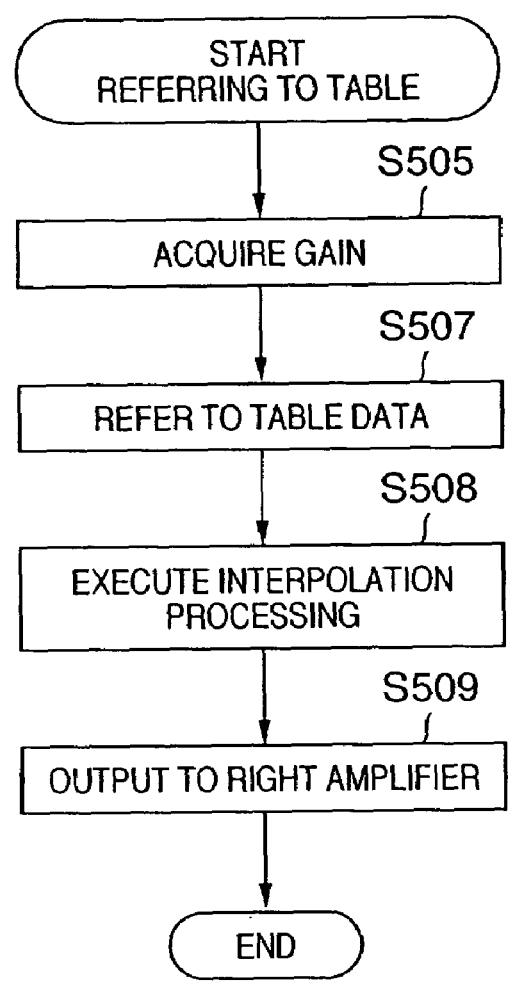
FIG. 5B is a flowchart illustrating gain control processing used in a gain adjusting circuit of a right channel according to the first embodiment of the present invention.

FIGS. 5A and 5B are flowcharts illustrating gain control processing used in the gain adjusting circuits 113, 114. In the first embodiment, a photometric value is acquired from the exposure controller 122 that controls the exposure of the image sensing apparatus, and the gains corresponding to Anleft, Anright are supplied to the left and right amplifiers, namely the gain adjusting circuits 113, 114, based upon the photometric value acquired.

First, at step S501 in FIG. 5A, the gain control circuit 115 acquires the gain data of a logarithmic value based upon the photometric value provided by the exposure controller 122 and outputs the data to the dB/linear conversion circuit 112. Next, at step S502, the dB/linear conversion circuit 112 converts the acquired gain data of the logarithmic value to linear data. In step S503, the linear data is output to the gain adjusting circuit 113 on the left side.

Meanwhile, at step S505 in FIG. 5B, the gain control circuit 115 outputs the gain data of the logarithmic value, which has been obtained based upon the photometric value provided by the exposure controller 122, to the table referring circuit 111 as well. Next, at step S507, the table referring circuit 111 acquires linear gain data for the right channel corresponding to the entered gain data of the logarithmic value for the left channel from the gain table of memory table 120. In a case where gain data acquired at step S505 is situated between items of data constituting the gain table, reference is had to the items of data on both sides, interpolation is performed at step S508 and gain data is calculated. The gain data for the right channel in the table is in linear term, the obtained gain data is directly outputted to the gain adjusting circuit 114 on the right side in step S509. Thus, by applying gains suited to the left and right channels, video signals having equal levels can be obtained.

The numerical values in the drawings are merely examples and other numerical values may be used. Further, the first embodiment describes an arrangement in which gain is decided in the gain control circuit 115 based upon the photometric value obtained by the exposure controller 122. However, an arrangement set up by the user also is permissible.

Second Embodiment

Figure 6:
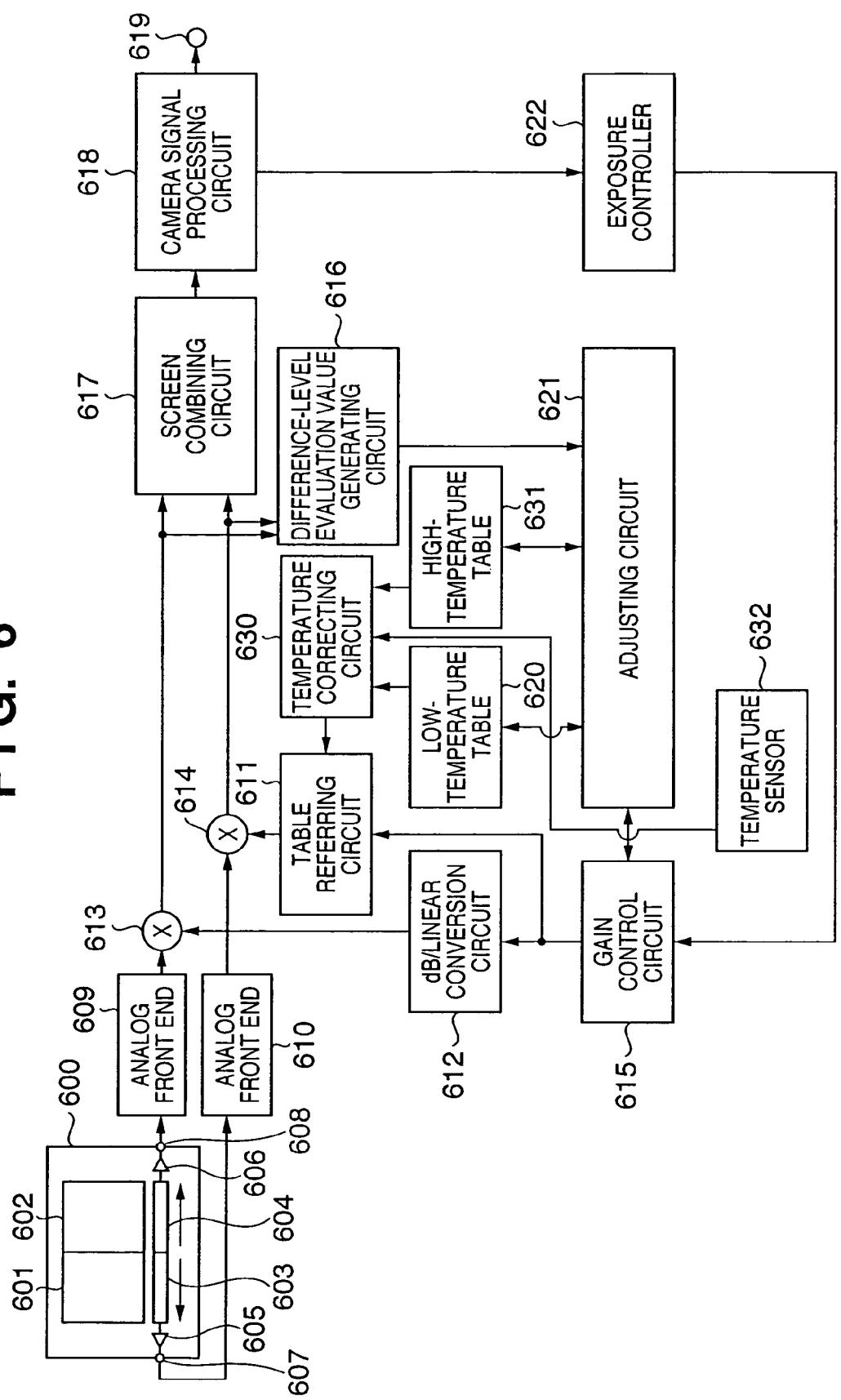
FIG. 6 is a block diagram illustrating the structure of a video camera according to a second embodiment of the present invention.
Figure 8:
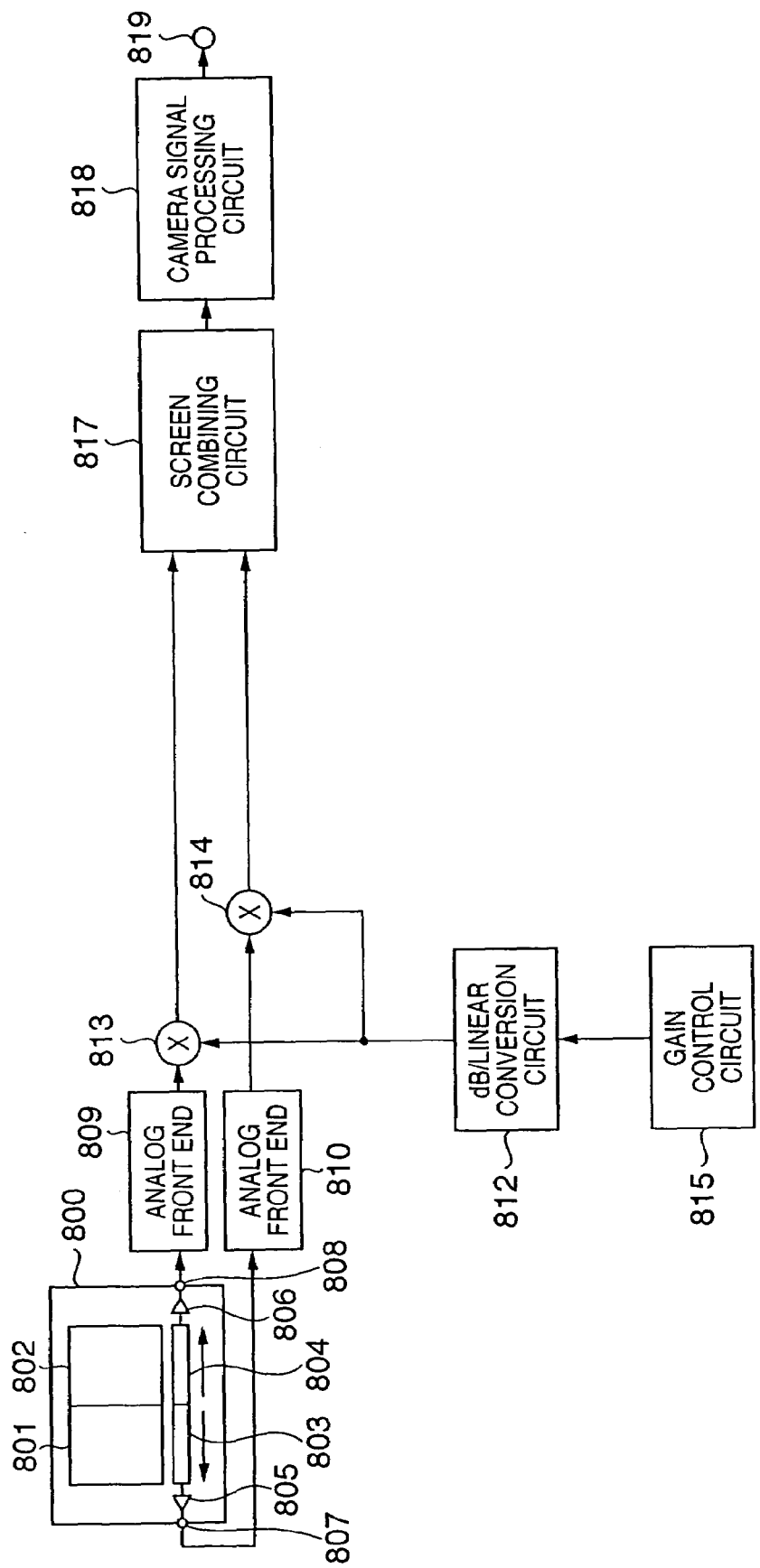
FIG. 8 is a diagram useful in describing an image sensing apparatus according to an example of the prior art.

FIG. 6 is a block diagram illustrating the structure of a digital video camera according to a second embodiment. Components 600 to 622 in FIG. 6 are similar to components 100 to 122 in FIG. 1 of the first embodiment. The illustrated image sensing apparatus uses an image sensing device in which an image sensing screen is split into a plurality of areas, an independent charge transfer section, amplifier and output terminal are provided for each area and sensed-image signals are read out in parallel. Therefore, redundant duplicate of explanation of these components is omitted here. This apparatus further includes table data 631 for when temperature is high, table data 620 for when temperature is low, a temperature correcting circuit 630 for performing a correction conforming to temperature based upon two types of table data, and a temperature sensor 632.

As mentioned above in the first embodiment of the invention, a decline in image quality such as the appearance of a boundary line ascribable to a level difference between two divided areas occurs if an image is produced by combining image signals from the two divided areas. The problem is caused by non-uniformity of characteristics of the amplifiers and peripheral circuits of each of the areas in the paths from the area sensor 600 to the analog front ends 609, 610. There are cases where these characteristics vary depending upon a change in temperature. A decline in image quality such as the appearance of a boundary line ascribable to a level difference between areas occurs is caused by a change in temperature even in the arrangement set forth in the first embodiment. According to the second embodiment of the invention, it is so arranged that a correction conforming to temperature in the vicinity of the image sensing device is performed using a temperature sensor in view of these circumstances.

The data table is generated at the time of adjustment at the factory, by way of example. as indicated in the first embodiment of the invention. However, in the second embodiment, two types of data tables are provided, namely the low-temperature table 620 for when the generation of the data table is carried out under comparatively low-temperature conditions, and the high-temperature table 631 for when the generation of the data table is carried out under comparatively high-temperature conditions. An example of table data is illustrated in FIG. 7. The temperature sensor 632 in FIG. 6 measures temperature in the vicinity of the image sensing device and supplies this information to temperature correcting circuit 630. The degrees of the temperatures when the low-temperature table 630 and the high-temperature table are generated may be inputted by an operator using operation keys (not shown) provided on the camera, or inputted from an external computer if the camera has an communication unit to communicate with an external computer. Alternatively, the temperature sensor 632 may be also connected to the adjusting circuit 621, and supply measured temperature to the adjusting circuit 621 which causes the supplied temperature information to be reflected at the time of generation of the table data. On the basis of the numerical values from the two types of data tables, the temperature correcting circuit 630 calculates gain data suited to the temperature prevailing at this time and supplies the gain data to table referring circuit 611. The latter calculates gain data in a manner similar to that of the first embodiment of the invention and applies it as the gain of the right channel.

Figure 9:
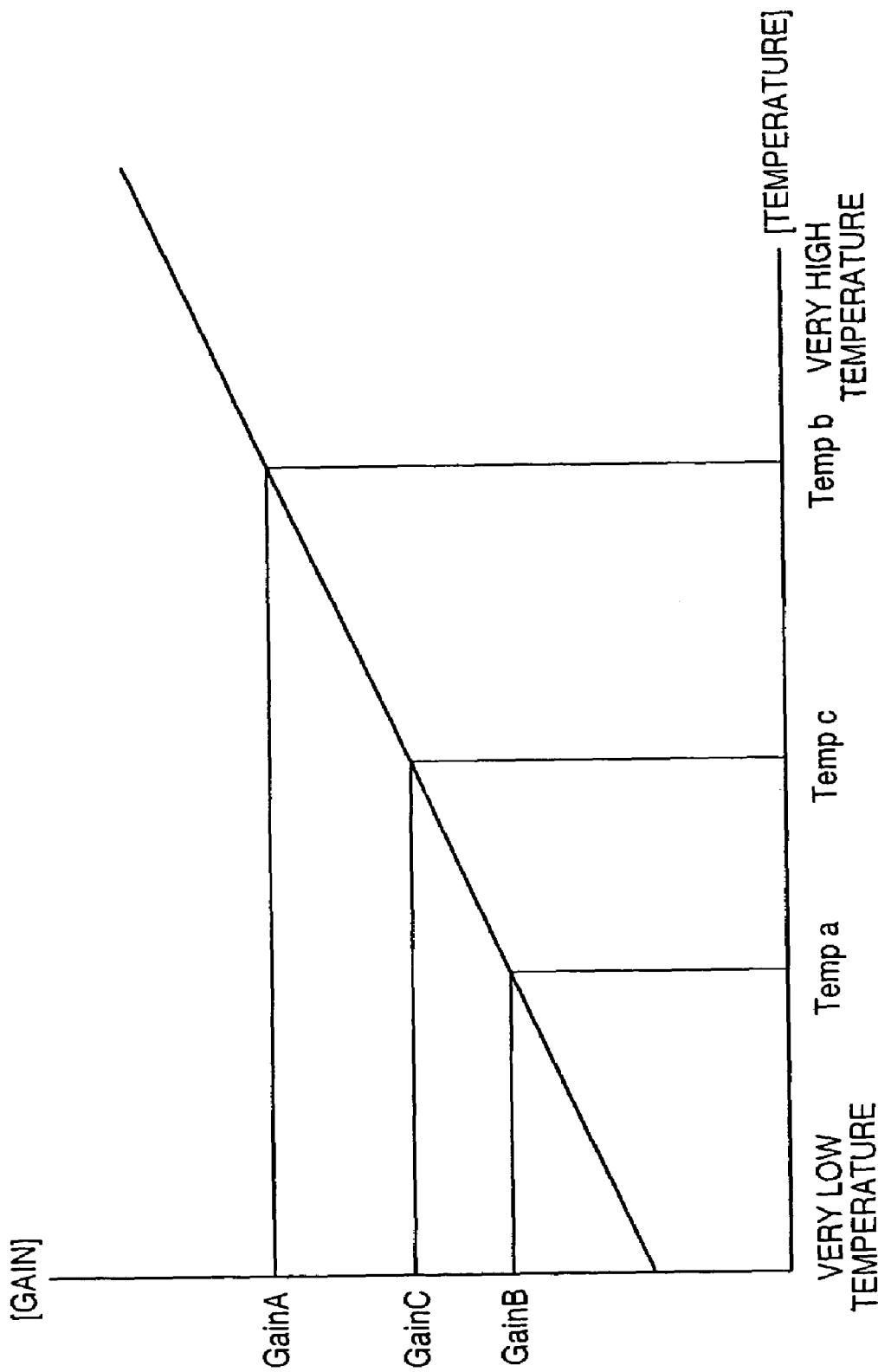
FIG. 9 is a graph useful in describing a technique for calculating gain data from temperature according to a second embodiment of the present invention.

FIG. 9 is a graph useful in describing a technique for calculating gain data in accordance with temperature sensed by the temperature sensor 632. Here Temp-a, Temp-b and Temp-c represent temperature at the time of low-temperature adjustment, temperature at the time of high-temperature adjustment and present temperature, respectively, and Gain-A, Gain-B and Gain-C represent gain at the time of low-temperature adjustment, gain at the time of high-temperature adjustment and calculated gain at the present time, respectively. The gains Gain-A, Gain-B corresponding to the temperatures obtained by reference to the two types of table data correspond to Temp-a, Temp-b, respectively, and if the present temperature is Temp-c, the gain to be used in control is calculated as Gain-C from the graph.

By thus applying a temperature correction, boundaries ascribable to differences between a plurality of output signals from an image sensing device can be made inconspicuous under any temperature conditions and a level difference can be eliminated. Further, by applying the structure of the second embodiment to a video camera, it is possible to adjust a level difference between areas at high speed when the signals are outputted through a plurality channels from the areas.

The temperature correction shown in FIG. 9 is described as linear interpolation. However, other interpolation curves may be used. Further, though the data tables in FIG. 6 are of two types, any number of plural types of data tables may be used. Further, though the temperature sensor is in close proximity to the image sensing device, it may be situated at any position in terms of structure, and it goes without saying that this sensor may be used in other applications as well.

In the first and second embodiments, arrangements in which signals from an area sensor are read out by read-out means on two channels are described. However, it goes without saying that the present invention is also applicable to an arrangement using read-out on three or more channels. In such case, it will suffice to adopt any one of the read-out channels as a reference and prepare correction values [values corresponding to Anright in FIG. 4 or Anright (cold, hot) in FIG. 7], which correspond to the gain used on this read-out channel, for respective ones of the other read-out channels.

Further, a video camera is described as an example in the first and second embodiments. However, the invention is not limited to a video camera. If the image sensing apparatus is one that senses an image using a solid-state image sensing device, then it is possible to apply the present invention to this apparatus.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-288865 filed on Aug. 7, 2003, which is hereby incorporated by reference herein.

What is claimed is:

1. An image sensing apparatus using an image sensing device having at least first and second output terminals, comprising:
   first and second amplifiers that independently amplify signals that are output from the first and second output terminals, respectively;
   a first gain controller that controls gain applied to said first amplifier;
   memory that stores data, which relates to gain to be applied to said second amplifier, that corresponds to respective ones of a plurality of different gains to be applied to said first amplifier; and
   a second gain controller that controls gain applied to said second amplifier in accordance with the data relating to gain to be applied to said second amplifier, obtained from said memory, corresponding to the gain applied to said first amplifier;
   wherein the data relating to gain stored in said memory is obtained by first supplying same gain to both said first and second amplifiers, and obtaining a level ratio of signals from said first and second amplifiers at each gain with regard to a plurality of different gains.

2. The apparatus according to claim 1, wherein the data stored in said memory is calculated in a process for manufacturing said image sensing apparatus and is stored in a non-volatile memory.

3. The apparatus according to claim 1, wherein data between items of data stored in said memory is obtained by interpolation.

4. The apparatus according to claim 1, wherein said first gain controller includes:
   a gain supply unit that supplies gain of a logarithmic value; and
   a log-linear converter that converts the logarithmic value to a linear numerical value;
   said first gain controller controlling said first amplifier by the linear numerical value obtained by the conversion.

5. The apparatus according to claim 4, wherein spacing between items of data stored in said memory is a logarithmic width.

6. The apparatus according to claim 1, further comprising:
   a temperature detector that detects temperature in the vicinity of the image sensing device,
   wherein said memory stores data, which relates to gain to be applied to said second amplifier, that corresponds to at least two different temperatures, and
   data to be applied to said second amplifier at the detected temperature is calculated by interpolation between data relating to gains of the two different temperatures selected from the memory.

7. The apparatus according to claim 1, further comprising a photometry circuit;
   wherein said first gain controller controls gain based upon a photometric value obtained by said photometry circuit.

8. The apparatus according to claim 1, further comprising a control panel that stipulates gain;
   wherein said first gain controller uses gain that has been stipulated by said control panel.

9. A gain control method in an image sensing apparatus that includes an image sensing device having at least first and second output terminals, and first and second amplifiers that independently amplify signals that are output from the first and second output terminals, respectively, said method comprising steps of:
   controlling gain applied to said first amplifier;
   reading data relating to gain to be applied to said second amplifier from memory in accordance with gain applied to said first amplifier, the data, which relates to gain to be applied to said second amplifier, that corresponds to respective ones of a plurality of different gains to be applied to said first amplifier; and
   controlling gain applied to said second amplifier based upon the data read from the memory;
   wherein the data relating to gain stored in said memory is obtained by first supplying same gain to both said first and second amplifiers, and obtaining a level ratio of signals from said first and second amplifiers at each gain with regard to a plurality of different gains.

* * * * *